(12) United States Patent
Kirovski et al.

(10) Patent No.: US 8,467,278 B2
(45) Date of Patent: Jun. 18, 2013

(54) PROTECTING OPTICAL MEDIA USING RANDOM, MOVING RADIO FREQUENCY SCATTERERS

(75) Inventors: Darko Kirovski, Kirkland, WA (US); Gerald Reuben DeJean, Redmond, WA (US); Barry C. Bond, Redmond, WA (US); Sebastian Lange, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 12/365,005

(22) Filed: Feb. 3, 2009

(65) Prior Publication Data
US 2010/0085853 A1    Apr. 8, 2010

Related U.S. Application Data

(60) Provisional application No. 61/102,954, filed on Oct. 6, 2008.

(51) Int. Cl.
*G11B 11/00* (2006.01)
*G11B 15/04* (2006.01)

(52) U.S. Cl.
USPC ........ 369/53.21; 428/817; 720/718; 235/375; 369/275.4

(58) Field of Classification Search
USPC ............. 369/53.21, 275.4; 428/817; 720/718; 235/375
See application file for complete search history.

(56) References Cited

U.S. PATENT DOCUMENTS

| 7,106,199 | B2 * | 9/2006 | Lee et al. | 340/572.3 |
| 7,653,919 | B2 * | 1/2010 | Potyrailo et al. | 720/718 |
| 7,677,438 | B2 * | 3/2010 | DeJean et al. | 235/375 |
| 2005/0091491 | A1 | 4/2005 | Lee | |
| 2007/0002707 | A1 * | 1/2007 | Kwong et al. | 369/52.1 |
| 2007/0116988 | A1 * | 5/2007 | Wisnudel et al. | 428/817 |
| 2007/0127352 | A1 | 6/2007 | Oshima | |
| 2007/0159400 | A1 | 7/2007 | DeJean | |
| 2007/0230923 | A1 * | 10/2007 | Takahashi et al. | 386/126 |
| 2008/0037071 | A1 * | 2/2008 | Ohta | 358/403 |
| 2008/0137848 | A1 | 6/2008 | Kocher | |

FOREIGN PATENT DOCUMENTS

WO    2007072351 A2    6/2007

OTHER PUBLICATIONS

Gerald Dejean and Darko Kirovski, "RF-DNA: Radio-Frequency Certificates of Authenticity", http://www.springerlink.com/content/7513206j053415m3/, P. Paillier and I. Verbauwhede (Eds.): CHES 2007, LNCS 4727, pp. 346-363, 2007, 18 pages.

Ahmet M. Eskicioglu, et al., "Security of Digital Entertainment Content from Creation to Consumption", http://www.sci.brooklyn.cuny.edu/~eskicioglu/papers/IMAGECOM2003.pdf, Signal Processing: Image Communication 18 (2003) 237-262, 26 pages.

Paul Kocher, et al., "Self-Protecting Digital Content", A Technical Report from the CRI Content Security Research Initiative,http://www.cryptography.com/resources/whitepapers/SelfProtectingContent.pdf, Copyright 2002-2003 by Cryptography Research, Inc. (CRI), 14 pages.

* cited by examiner

*Primary Examiner* — Joseph Haley
*Assistant Examiner* — Carl Adams
(74) *Attorney, Agent, or Firm* — Lee & Hayes, PLLC

(57) ABSTRACT

The subject innovation relates to systems and/or methodologies for using randomly positioned electromagnetic scatterers deposited into a predetermined region of an optical storage medium (e.g., Blue Ray DVD, HD DVD, CD, etc.) as a distinct three dimensional (3D) hard-to-copy digital rights management feature. A scatterers' topology is scanned using a matrix of antennas that sense the scatterers' electromagnetic response as the optical disc revolves at near-constant angular speed. The response, f, called an RF fingerprint, is then concatenated with an arbitrary text, t, that defines the digital rights management information imposed by the disk publisher.

19 Claims, 13 Drawing Sheets

PROTECTING OPTICAL MEDIA USING RANDOM, MOVING RADIO FREQUENCY SCATTERERS

CROSS REFERENCE TO RELATED APPLICATIONS

This application claims priority to U.S. Provisional Patent Application Ser. No. 61/102,954, filed on Oct. 6, 2008, entitled "PROTECTING OPTICAL MEDIA USING RANDOM, MOVING RADIO FREQUENCY SCATTERERS", the entirety of which is incorporated herein by reference.

BACKGROUND OF THE INVENTION

The growth of the Internet, digital media, and peer-to-peer networking have increased the pace and volume of information distribution. Information, such as songs, movies, books, etc. can be made instantly available to a large portion of the modern world, whereas not too long ago the same sort of data/information may have never become easily accessible in many places. There are at least two reasons for this. First, digital media now rivals and often surpasses the price, ease of use, and quality of traditional analog media sources. Second, networking in the information age has essentially connected all corners of the earth.

The ability to easily transmit and share data has opened up markets for retailers and publishers that may not have been typically available in the past. In addition, consumers can now select to receive their data from more sources than ever before. However, the ease with which digital data, and digital media in particular, can be shared, copied, and/or distributed has also led to increased piracy. According to the Business Software Alliance (BSA), the annual estimated loss due to piracy is tens of billions of dollars worldwide, with a significant portion of that being in the United States alone.

Ultimately, software and digital media piracy results in the loss of tax revenues, jobs, and growth in the software and media industries. In recent years, multiple efforts have been made to reduce the incidents of piracy, including prosecuting offenders and various digital rights management techniques. However, many of these techniques have experienced mixed results, and/or had difficulty gaining acceptance from consumers.

SUMMARY OF THE INVENTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The claimed subject matter relates to a system and/or methodology for protecting optical media using random, moving radio frequency scatterers. In accordance with various aspects of the claimed subject a constellation of electromagnetic scatters can be randomly appended, affixed or otherwise deposited into a predetermined region of an optical media (e.g., optical disc). The constellation of electromagnetic scatters can create a distinct a three-dimensional product identification that is difficult to copy or forge.

The optical media can be run, played, or otherwise executed via a specialized media device that includes an electromagnetic response scanner component, and a verification component. The electromagnetic response scanner component can determine the electromagnetic response of the electromagnetic scatters (e.g., RFDNA) as the optical media revolves at a near constant angular speed. The electromagnetic response is unique to each optical media similar to a fingerprint, and can be referred to as a radio frequency (RF) fingerprint.

The verification component can determine the authenticity/digital rights of the optical media by comparing the RF fingerprint determined by the electromagnetic response scanner component to a control RF fingerprint. The control RF fingerprint is determined during production of the optical media, and can be stored on the optical media and/or in a remote data store, such as a remote processor. In addition, the verification component can use a public key cryptosystem in conjunction with the RF fingerprint verification to determine the authenticity/digital rights of the optical media.

To the accomplishment of the foregoing and related ends, certain illustrative aspects of the innovation are described herein in connection with the following description and the annexed drawings. These aspects are indicative of various ways in which the innovation may be practiced, all of which are intended to be covered by the subject innovation. Other advantages and novel features of the innovation may become apparent from the following detailed description of the innovation when considered in conjunction with the drawings.

DETAILED DESCRIPTION OF THE INVENTION

Figure 1:
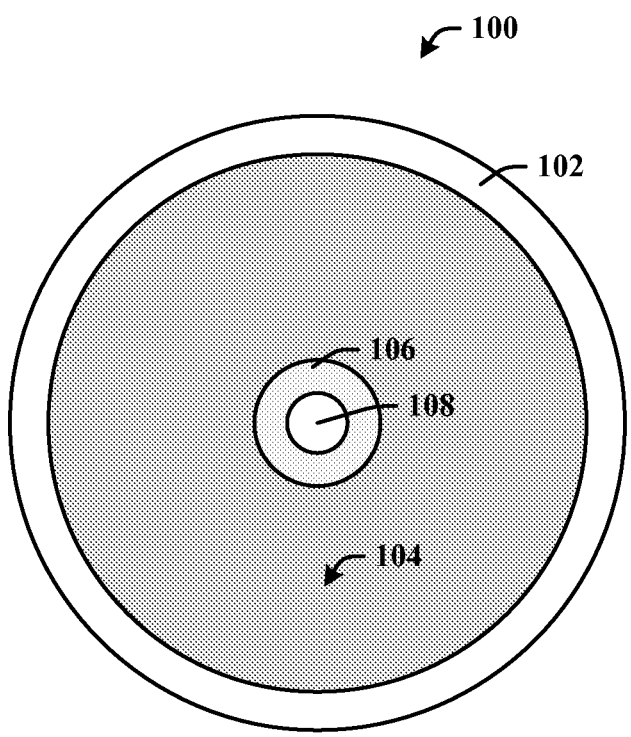
FIG. 1 illustrates an example optical medium in accordance with the subject specification.

The subject innovation relates to a system and/or methodology for using randomly positioned electromagnetic scatterers deposited into a predetermined region of an optical storage medium (e.g., Blue-Ray DVD, HD DVD, CD, etc.) as a distinct three dimensional (3D) hard-to-copy feature. A scatterers' topology is scanned using a matrix of antennas that sense the scatterers' electromagnetic response as the optical disc revolves at near-constant angular speed. The response, f, called an RF fingerprint, is then concatenated with an arbitrary text, t, that defines the digital rights management information imposed by the disk publisher.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom.

Referring initially to FIG. 1 an example optical medium 100 (e.g., optical disc, DVD, CD, Laser Disc, HD-DVD, Blu-Ray Disc, etc.) is shown in accordance with an aspect of the subject innovation. The disc 100 is illustrative of current conventional optical disc that are currently used and well known in the art. The disc 100 includes an outer circumference 102, an area 104, an inner circumference 106, and an aperture 108. In the example shown, the outer circumference 102 is blank or contains no data, whereas the area 104 can be encoded with data. The data in the area 104 is comprised of one ore more tracks, and each track contains a plurality of pits that can be interpreted, decoded, or otherwise read by a reading device (e.g., laser, CD player, blu-ray player, HD-DVD player, etc.). For example, the disc 100 can be a Blu-Ray Disc, and the area 104 can include one or more High Definition (HD) Movies and associated content. The inner circumference 106 is also blank on the disc 100 as illustrated, however it is to be appreciated that the inner circumference 106 can also contain a plurality of data types. The aperture 108 allows the disc 100 to adaptively receive a disc drive (not shown) that spins the disc and facilitates the reading device in decoding the disc 100.

Figure 2:
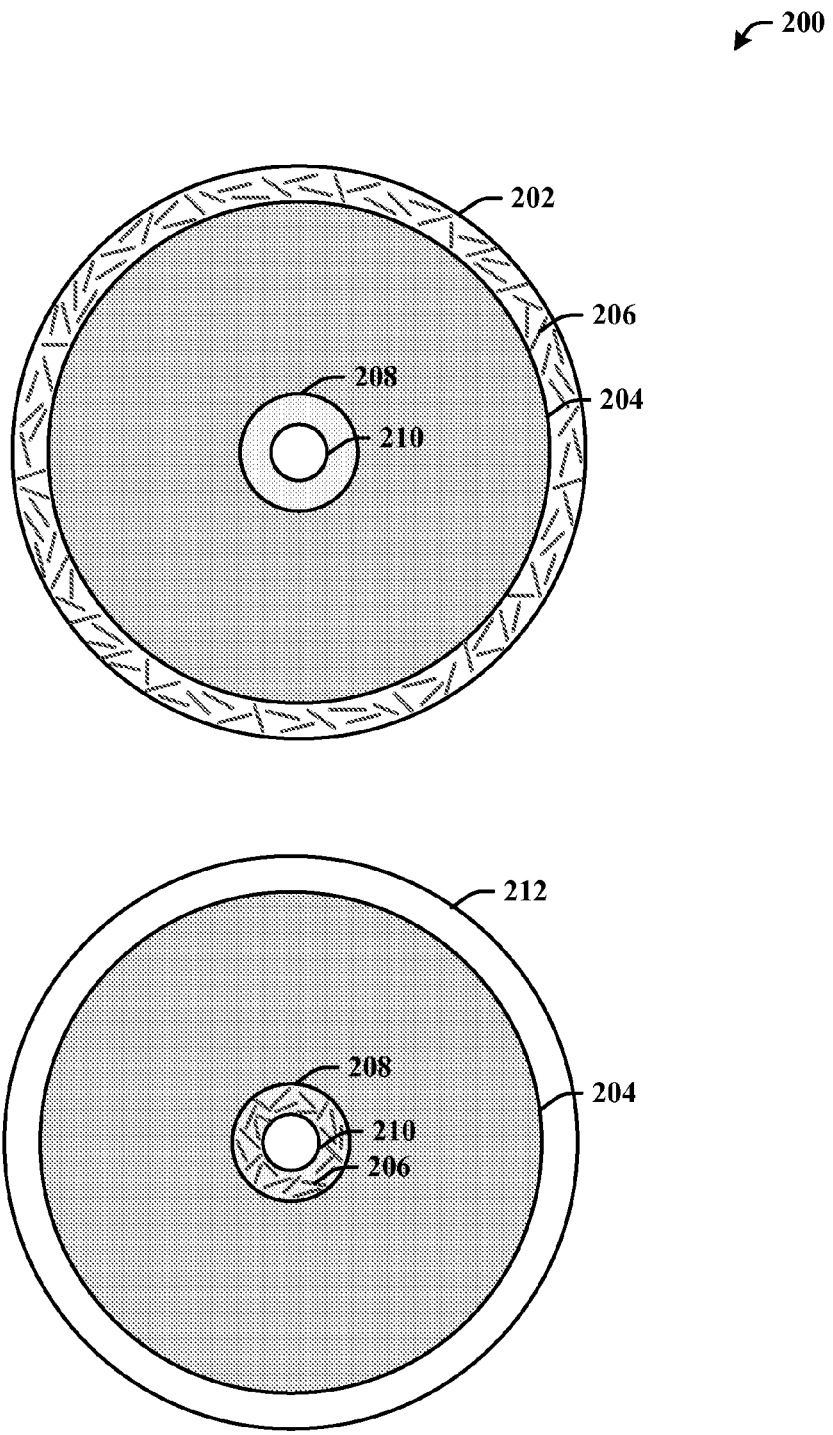
FIG. 2 illustrates example techniques that can be used to apply a constellation of electromagnetic scatterers to optical disc in accordance with an aspect of the subject specification.

FIG. 2 illustrates example techniques that can be used to imbed, append, or otherwise apply electromagnetic scatterers to an optical disc in accordance with an aspect of the subject innovation. A first example optical disc 202 illustrating electromagnetic scatterers (RFDNA) 206 applied to an outer circumference 204 of the disc 202 is shown. For instance, the RFDNA 206 can be comprised of a plurality of thin cut metallic wires (e.g., 5 cm long). The background of the outer circumference 204 can be absorbent and/or reflective so that it does not interfere with the RF response of the RFDNA 206.

In addition, a second example optical disc 212 is shown illustrating a constellation of RFDNA 206 applied to an inner circumference 208 of the disc 212. The constellation of RFDNA 206 placed along the outer circumference allows larger samples of measurements to be made. It is to be appreciated that these represent but a few examples and a plurality of techniques are possible within the scope and spirit of the subject innovation. In addition, the background of the inner circumference 208 can be absorbent and/or reflective so that it does not interfere with the RF response of the RFDNA 206.

Figure 3:
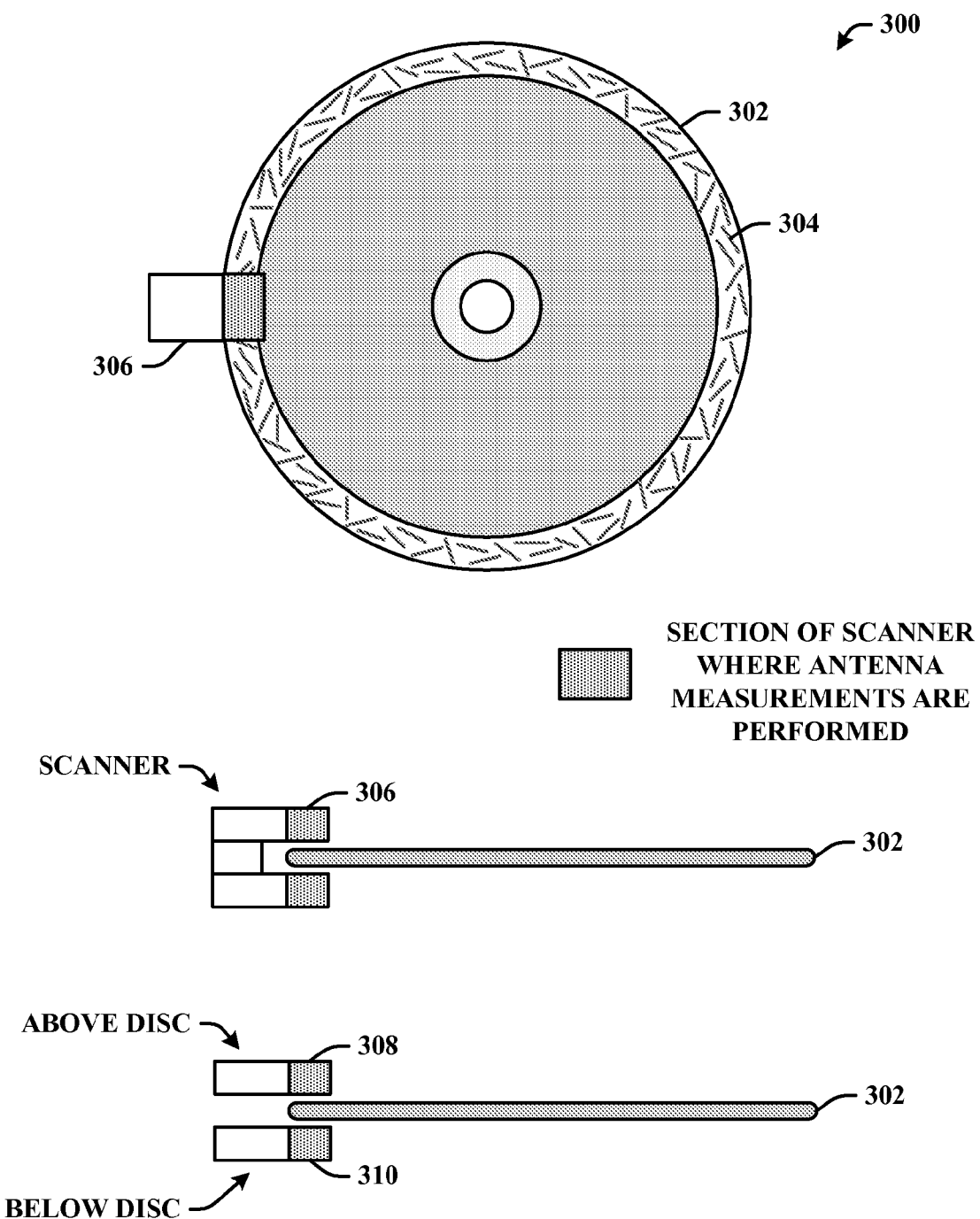
FIG. 3 illustrates an example system for scanning a constellation of electromagnetic scatterers on a revolving optical disc in accordance with an aspect of the subject specification.

FIG. 3 illustrates an example system 300 for scanning a constellation of electromagnetic scanners (RFDNA) while an optical disc 302 is revolving in accordance with an aspect of the subject innovation. The system 300 can scan, decode, or otherwise read an optical disc 302 having a constellation of RFDNA 304 wires implanted on the outer circumference of the optical disc 302. The system 300 enables two possible instances of measuring the RFDNA's 304 unique randomness. First, the system 300 enables a "sandwich" format that consists of a scanner 306 using a first measurement panel 308 above and a second measurement panel 310 below the optical disc 302 loaded with RFDNA 304, and taking measurements from both sides of the scanner 306. Second, the system 300 enables a "stamp" format that consists of using a scanner 306 having either a first panel 308 above the optical disc 302, or a second panel 310 below the optical disc 302. In accordance with this embodiment, the panels 308 or 310 take measurements from a single side of the optical disc 302.

It is to be appreciated that there is no physical contact between any part of the scanner 306 and the optical disc 302. The distance between the scanner 306 and the optical disc 302 can be a couple of millimeters (e.g., at 6 GHz), but this distance can change depending on the frequency of use for the application. An advantage of placing the constellation of RFDNA 304 wires on the outer circumference of the optical disc's 302 plastic is that the placement of the scanner 306 can exist very close to the edge of the optical disc 302 in an unobtrusive manner. It is to be further appreciated, that this is but a single embodiment, and a plurality of techniques are possible within the scope and spirit of the subject innovation.

Figure 4:
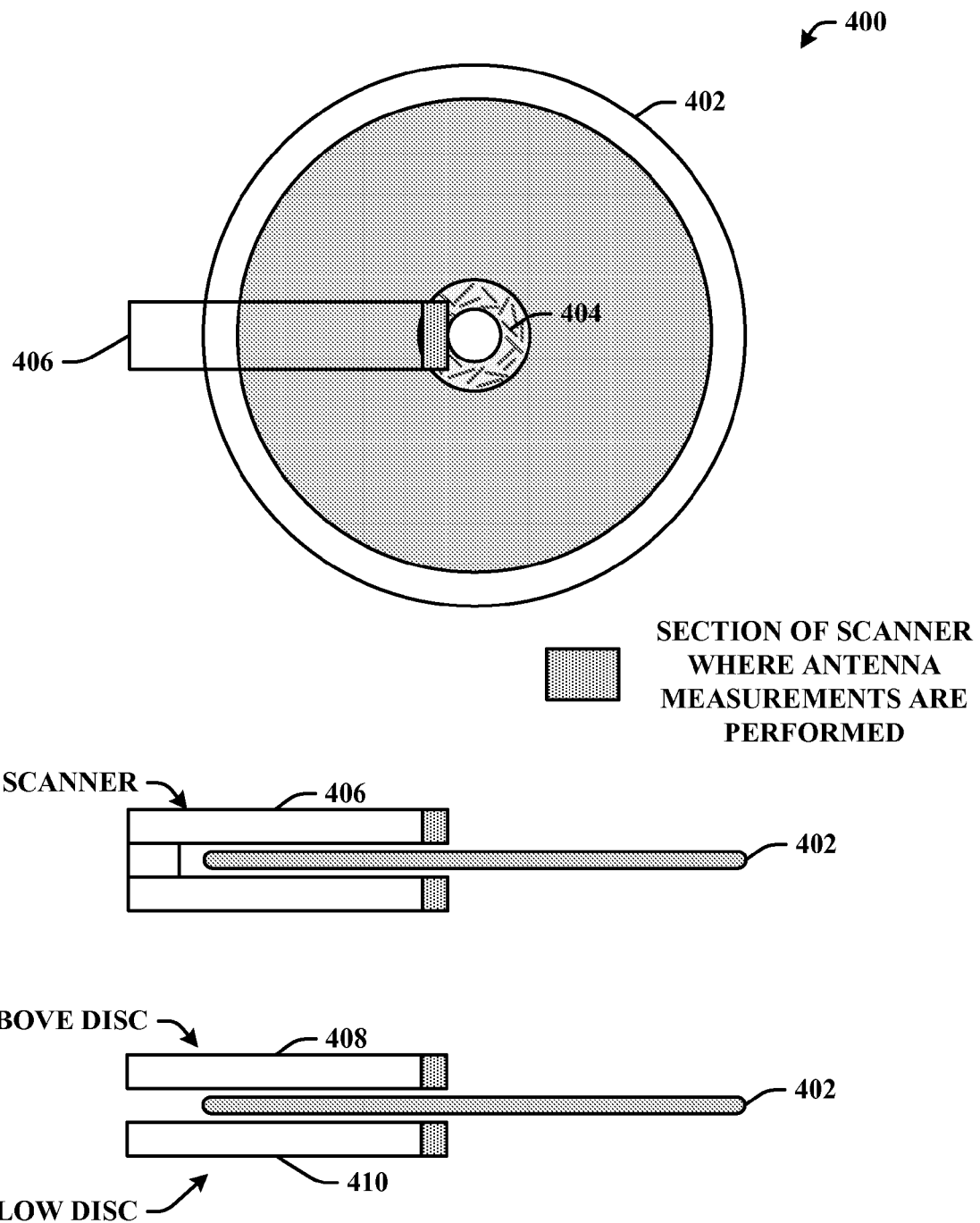
FIG. 4 illustrates an example system for scanning a constellation of electromagnetic scatterers from a revolving optical disc in accordance with an aspect of the subject specification.

FIG. 4 illustrates an example system 400 for scanning a constellation of electromagnetic scatterers while an optical disc 402 is revolving in accordance with an aspect of the subject innovation. The system 400 can scan, decode, or otherwise read an optical disc 402 having a constellation of electromagnetic scatterers (RFDNA) 404 wires implanted on the inner circumference of the optical disc 402. The system 400 enables two possible instances of measuring the RFDNA's 404 unique randomness. First, the system 400 enables a "sandwich" format that consists of a scanner 406 using a first measurement panel above the optical disc and a second measurement panel below the optical disc 402 loaded with RFDNA 404, and taking measurements from both sides of the scanner. The sandwich format can provide for the maximum number of measurements.

Second, the system 400 enables a "stamp" format that consists of using a scanner 406 having either a first panel 408 above the optical disc, or a second panel 410 below the optical disc 402 loaded with RFDNA 404 and taking measurements from one side of the optical disc 402. It is to be appreciated that there is no physical contact between any part of the scanner 406 and the optical disc 402. The distance between the scanner 406 and the optical disc 402 can be a couple of millimeters (e.g., at 6 GHz), but this distance can change depending on the frequency of use for the application. It is to be appreciated, that this is but a single embodiment, and a plurality of techniques are possible within the scope and spirit of the subject innovation.

Figure 5:
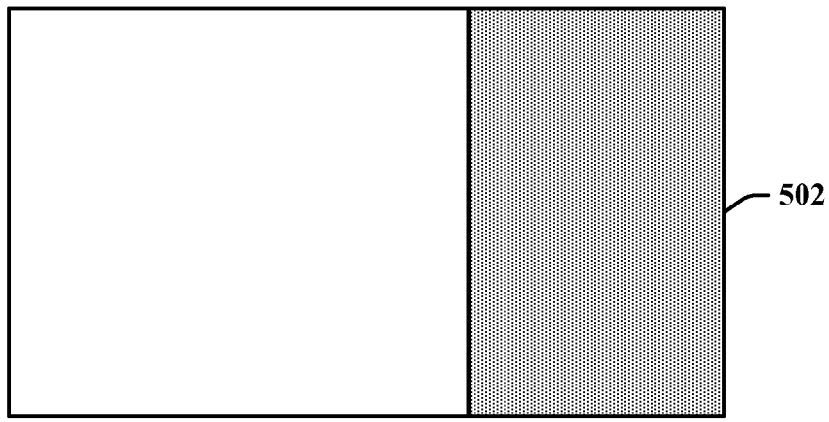
FIG. 5 illustrates an example top and bottom view of an electromagnetic scanner in accordance with an aspect of the subject specification.
Figure 5:
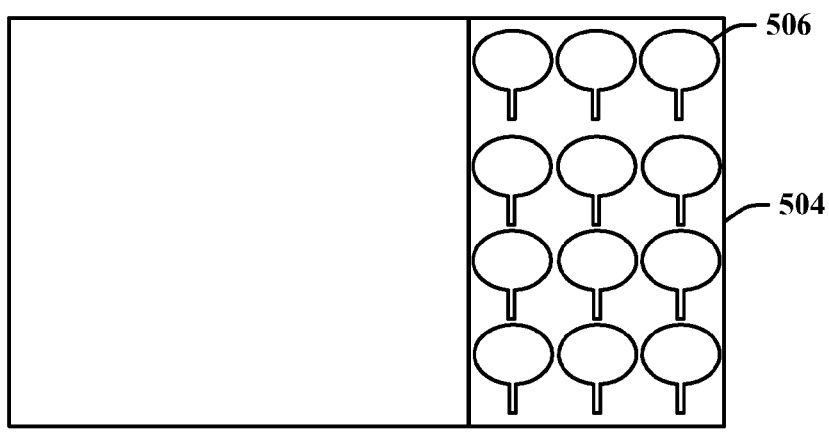
Figure 5:

FIG. 5 illustrates an example top and bottom view of an electromagnetic scanner (e.g., RFDNA scanner) 500 in accordance with an aspect of the subject innovation. A first side 502 contains the outer circuitry housing. The outer circuitry housing can be constructed from most any suitable material, including but not limited to plastic, metal, and so forth. A second side 504 contains a matrix of antennas 506. It is to be appreciated that the matrix of antennas 506 is not an array (e.g., in an architecture sense), because each antenna 506 is excited individually as opposed to all of the antennas 506 being excited simultaneously with some associated excitation phase ($\theta$). The antennas 506 can be most any of a plurality of design types (e.g., dipole, loop, patch, etc.). For instance, patch antennas can be ideal for an embodiment of the subject innovation due to their miniaturization capabilities, however a plurality of embodiments are possible. Depending on the design of the scanner 500, it may be optimal to design the matrix with as many antennas 506 as possible in order to maximize the number of measurements that are taken per optical disc. In the case of "sandwich" scanning (discussed supra), the scanner will theoretically contain twice as many antennas 506 as in the "stamp" scanning scenario (discussed supra). In addition, the antennas 506 can have a planar form factor.

Figure 6:
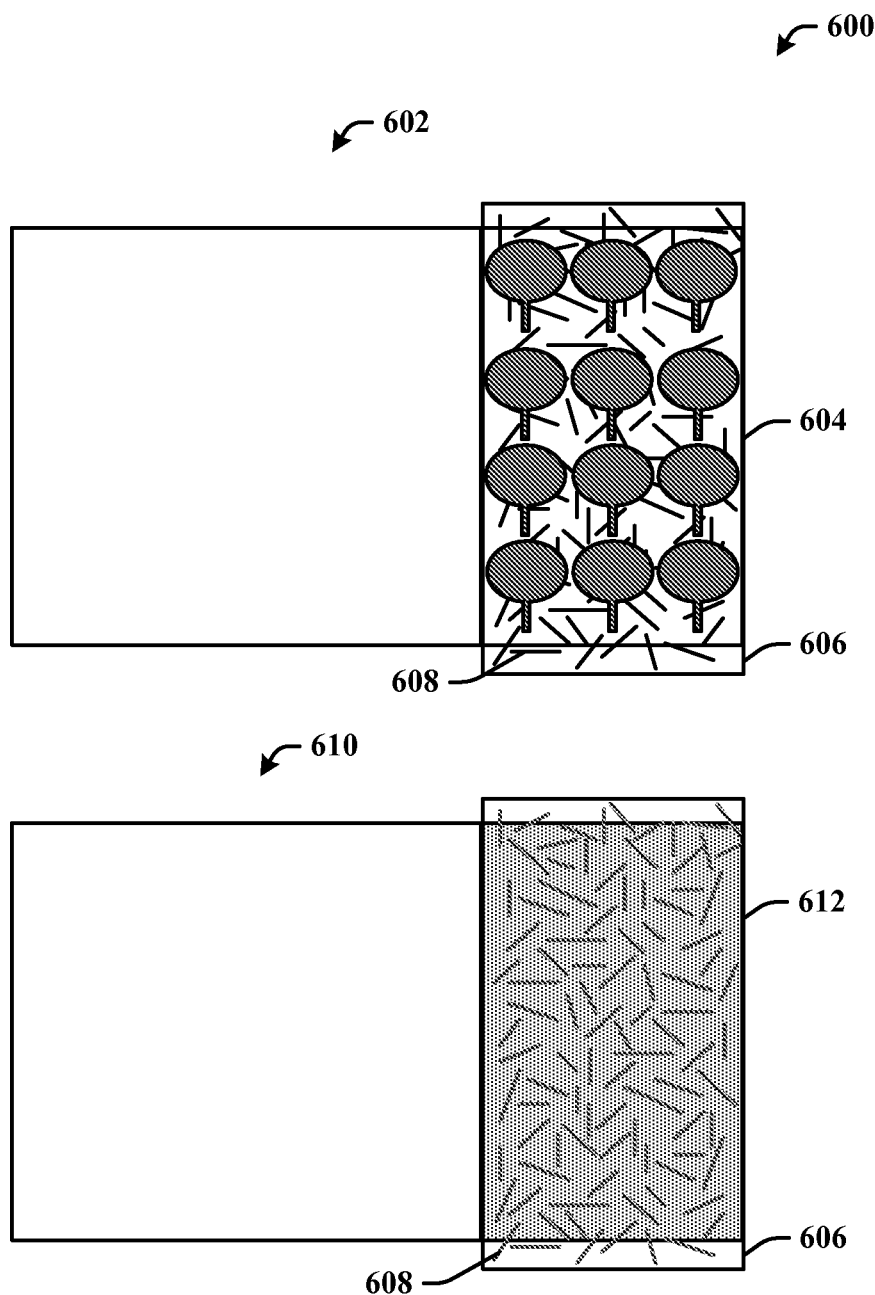
FIG. 6 illustrates an example macroscopic model of a scanner and optical disc loaded with a constellation of electromagnetic scatterers in accordance with an aspect of the subject specification.

FIG. 6 illustrates an example macroscopic model 600 of a scanner and optical disc loaded with electromagnetic scatterers (RFDNA). A top illustration 602 shows part of a scanner 604 above an optical disc 606 loaded with RFDNA 608. For instance, the illustration 602 can exhibit the case where the scanner 604 is above the optical disc 606 as in the "stamp" case (discussed supra), or the top side of the scanner 604 as in the "sandwich" case (discussed supra). The bottom illustration 610 shows the measurement panel 612 when the scanner is below the optical disc 606 loaded with RFDNA 608, such as previously discussed in the "stamp" case.

For instance, while scanning a RFDNA 608 instance, the RFDNA 608 is aligned to a fixed position with respect to the antenna matrix. The RFDNA 608 instance can have an absorbent and/or reflective background so that the environment behind the tag does not affect its RF response. The antennas considered in the innovation measure voltage (e.g., power, etc.) ratios between a transmitting antenna and a receiving antenna. When an RF wave initiated by one of the antennas hits the RFDNA 608 instance, its electromagnetic response is dependent upon the three dimensional (3D) positioning of the scatterers embedded in the RFDNA 608. This creates a distinct RF response, in particular in the near-field that can be received by any of the remaining antennas on the panel. Each receiver obtains a view of the RFDNA from its own perspective. The total voltage, Vn, of a device or port equals the sum of the voltage input into a device, Vn+, and the voltage received from a device Vn−: Vn=Vn++Vn−. For two antennas under test, four specific scattering parameters can be obtained for the two-port network. A matrix representation of the relationship between the voltage and the scattering parameters are shown below:

$$\begin{bmatrix} V_1^- \\ V_2^- \end{bmatrix} = \begin{bmatrix} s_{11} & s_{12} \\ s_{21} & s_{22} \end{bmatrix} \begin{bmatrix} V_1^+ \\ V_2^+ \end{bmatrix}$$

For example, for a system with M antennas, where M is an integer, one can measure M s11 and "M choose 2" s21 parameters. In order to enable this, each antenna is multiplexed to an analog/digital back-end capable of extracting the s21 parameter (e.g., insertion loss) for a particular antenna coupling.

In other words, a scatterers' topology is scanned using a matrix of antennas that sense the scatterers' electromagnetic response as the optical disk revolves at a near-constant angular speed. The response, f, called an RF fingerprint, is then concatenated with an arbitrary text, t, that defines the digital rights management information imposed by the disk publisher. The final string, m=f||t, is then compressed, hashed, and signed with the private key of the issuer. The resulting signature as well as compressed m, are stored onto the disk using a post-imprint technology. The estimated storage capacity is on the order of hundreds of bytes.

The verification of the authenticity of the disk can be performed in-field using a modified, specialized, or otherwise adapted disk player. After verifying the stored signature using the public key of the issuer, the player would read out the RF fingerprint of the disk, f', and compare it to the signed RF fingerprint; if ||f−f'||<ϵ the player would conclude that the disk is authentic. The verifier would be implemented using a tamper-resistant casing and it would send its result (disk authentic or not) to the main processing unit using an encrypted communication channel over a public interconnect.

Additionally or alternatively, m can be stored in places other than the disk itself, such as an online database. The fingerprint f' can be read from the disk, transmitted securely to a main processing unit, and the main processing unit computes f−f' to determine if the disk is authentic. Assuming the CPU is secure and/or tamperproof enough to make the f−f' calculation and determine the disk's authenticity.

Figure 7:
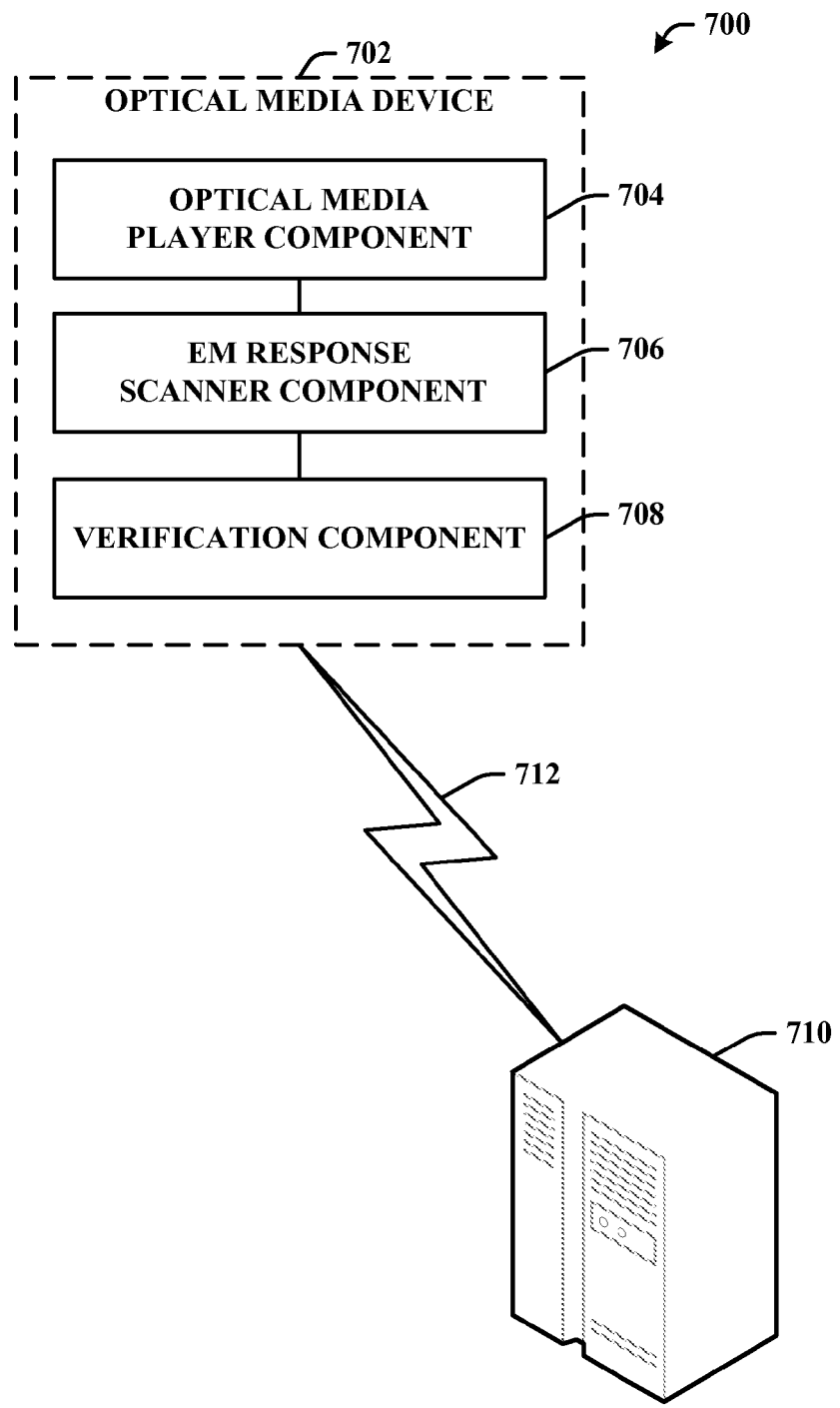
FIG. 7 illustrates an example system that protects optical media using random, moving radio frequency scatterers in accordance with an aspect of the subject specification.

Turning to FIG. 7 an example system that protects optical media using random, moving radio frequency scatterers is shown in accordance with an aspect of the subject innovation.

The system 700 includes an optical media device 702 having an optical media player component 704, an electromagnetic frequency scanner component 706, and a verification component 708. The optical media player component (hereinafter "player component") can interpret, decode, or otherwise read data contained on one or more instances of optical media (e.g., optical disc). As discussed previously, the optical disc can include but are not limited to DVD, CD, Laser Disc, HD-DVD, Blu-Ray Disc, and so forth.

The electromagnetic frequency scanner component 706 can determine a radio frequency (RF) fingerprint contained on the optical media using a plurality of antennas in a matrix. As previously discussed, the antennas in the electromagnetic frequency scanner component 706 can initiate an RF wave and determine the electromagnetic response of the electromagnetic scatterers (e.g., RFDNA) contained on the optical media. The electromagnetic response is dependent on the three dimensional (3D) positioning of a set of scatterers embedded on the media (See FIGS. 2-6). A distinct RF response is created, and the topology of the scatterers is determined by the matrix of antennas that sense the scatterers' electromagnetic response as the optical media revolves at a near constant speed. The electromagnetic response is known as the RF fingerprint, because each optical medium's electromagnetic response is unique due to the random three dimensional positioning of the RFDNA.

The verification component 708 can validate the authenticity of the optical media in a plurality of ways. For instance, the verification component 708 can perform the validation by comparing the RF fingerprint obtained by the electromagnetic response scanner component 706 with a control RF fingerprint (control) stored on the optical media, wherein the optical media player component 704 can obtain the control. If the RF fingerprint and the control are within a predetermined threshold then the disc is verified as being authentic.

Additionally or alternatively, the verification component 708 can validate the RF fingerprint against a control stored somewhere other than the optical media. For instance, the verification component 708 can access a main processing unit 710 via a communication link 712. The main processing unit 710 can be a server, a database, a computer, and so forth. The communication link 712 can be a global communication framework such as the internet, a wide area network, a local area network, and so forth. The verification component 708 can securely transmit the RF fingerprint to the main processing unit 710 via the communication link 712, and the main processing unit 710 can determine if the disc is authentic. Alternatively, the verification component 708 can acquire or obtain the control from the main processing unit 710, and determine if the disc is authentic. Furthermore, the disc's authenticity can be determined at least in part using a public key cryptosystem.

In operation, the optical media device 702 can take most any of a plurality of actions based on the verification of the optical media. For instance, if the verification component 708 determines that the disc is not authentic then the optical media device 702 can display an error message to a user, or offer a user the opportunity to obtain the necessary verification for the optical media via the communication link 712.

Figure 8:
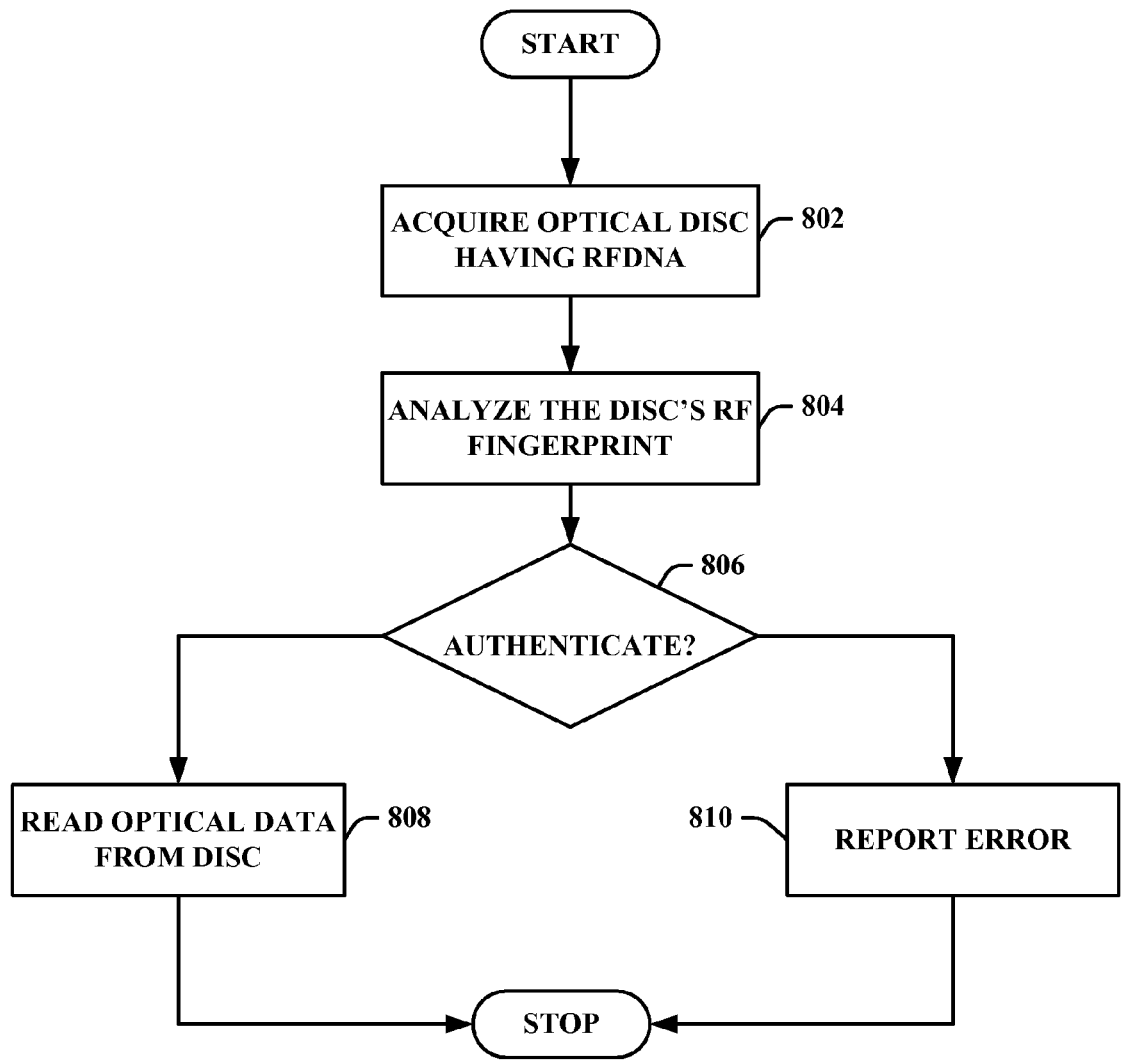
FIG. 8 illustrates an example methodology for protecting optical media using random moving radio frequency scatterers in accordance with an aspect of the subject specification.

FIG. 8 illustrates an example methodology for protecting optical media using random moving radio frequency scatterers in accordance with an aspect of the subject innovation. While, for purposes of simplicity of explanation, the methodologies are shown and described as a series or number of acts, it is to be understood and appreciated that the subject innovation is not limited by the order of acts, as some acts may, in accordance with the subject innovation, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject innovation.

At 802, an optical medium (e.g., optical disc) having a constellation of electromagnetic scatterers (RFDNA) is received, acquired, or otherwise obtained. As discussed previously, the optical medium can include but is not limited to DVD, CD, Laser Disc, HD-DVD, Blu-Ray Disc, and so forth. For example, a user can place the optical medium having RFDNA into a dedicated optical media device that plays/reads only that particular type of media. Additionally or alternatively, the optical medium can be automatically retrieved from an optical media store containing a plurality of optical media.

At 804, the RF fingerprint on the disc is analyzed. As noted supra, the RF fingerprint can be obtained via an antenna matrix, wherein the antennas can initiate an RF wave that causes an electromagnetic response by an RFDNA instance contained on the optical disc. The electromagnetic response of the RF wave is dependent on the three dimensional (3D) positioning of the of scatterers embedded in the disc (See FIGS. 2-6). A distinct RF response (e.g., RF fingerprint) is created, and the topology of the scatterers is determined by the matrix of antennas that sense the scatterers' electromagnetic response as the optical media revolves at a near constant speed.

At 806, the RF fingerprint on the disc is authenticated. As discussed previously, the RF fingerprint can be authenticated in a plurality of manners, including but not limited to comparing the RF fingerprint with a control RF fingerprint stored on the optical disc, and/or transmitting the RF fingerprint to a remote processor that verifies the disc's authenticity. At 808, if the disc is authenticated then the optical data stored on the disc can be read/played in accordance with the digital rights granted by the publisher.

Alternatively, at 810 if the disc cannot be authenticated then the optical data is not read or read with limited access, and a plurality of actions can be taken based on the failed authentication attempt. For example, the failed authentication can be reported to a main processing unit, the user can be given an opportunity to purchase/acquire authentication for the media, the media can be allowed to execute with limited functionality, and/or the media can be allowed to execute for a predetermined time period on a trial basis. It is to be appreciated that these are but a few examples, and a plurality of embodiments are possible within the scope and spirit of the subject innovation.

Figure 9:
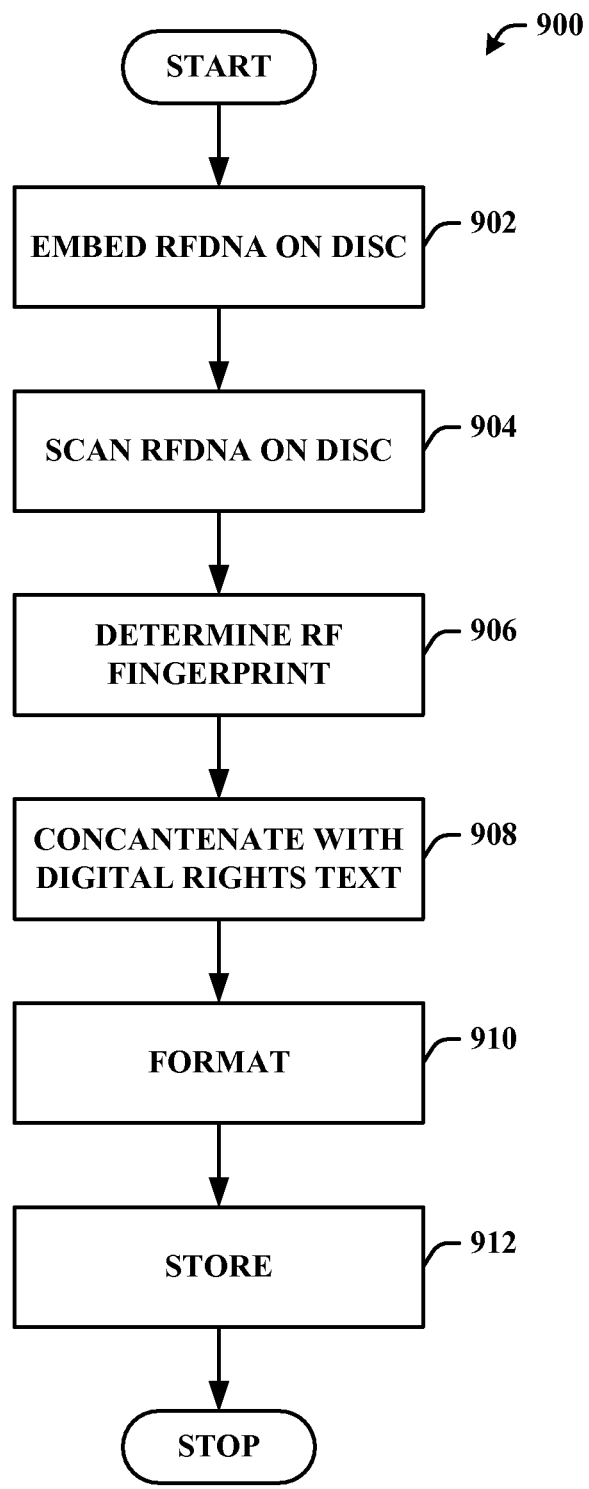
FIG. 9 illustrates an example methodology for implanting digital rights management electromagnetic scatterers on an optical disc in accordance with an aspect of the subject specification.

FIG. 9 illustrates an example methodology for implanting electromagnetic scatterers for digital rights management on an optical disc in accordance with an aspect of the subject innovation. At 902, a constellation of electromagnetic scatterers (e.g., RFDNA wires) are randomly implanted on an optical disc (e.g., disk, diskette). As previously discussed, the electromagnetic scatterers can be appended to an outer or inner circumference of the disc (See FIGS. 3-4).

At 904, the electromagnetic scatterers on the disc are scanned while the disc revolves at a near constant angular speed. For example, the electromagnetic scatterers can be scanned using an antenna matrix. While scanning an instance of the electromagnetic scatterers, it is aligned to a fixed position with respect to the antenna matrix (See FIG. 6). The electromagnetic scatterers instance can have an absorbent and/or reflective background such that the environment behind the RFDNA wires does not affect the RF response. When an RF wave initiated by one of the antennas hits the RFDNA instance, its electromagnetic response depends on the three dimensional (3D) positioning of the scatterers embedded in the RFDNA 608. This creates a distinct RF response, in particular in the near-field that can be received by any of the remaining antennas in the matrix. Each receiving antenna obtains a view of the RFDNA from its own perspective.

The total voltage, Vn, of a device or port equals the sum of the voltage input into a device, Vn+, and the voltage received from a device Vn−: Vn=Vn++Vn−. For two antennas under test, four specific scattering parameters can be obtained for the two-port network. A matrix representation of the relationship between the voltage and the scattering parameters are shown below:

$$\begin{bmatrix} V_1^- \\ V_2^- \end{bmatrix} = \begin{bmatrix} s_{11} & s_{12} \\ s_{21} & s_{22} \end{bmatrix} \begin{bmatrix} V_1^+ \\ V_2^+ \end{bmatrix}$$

For example, for a system with M antennas, where M is an integer, one can measure M s11 and "M choose 2" s21 parameters. In order to enable this, each antenna is multiplexed to an analog/digital back-end capable of extracting the s21 parameter (e.g., insertion loss) for a particular antenna coupling.

At 906, the RF fingerprint created by the randomly embedded constellation of electromagnetic scatterers (e.g., wires, RFDNA wires, etc.) is determined. For example, the scatterers' topology is scanned using a matrix of antennas that sense the scatterers' electromagnetic response as the optical disc revolves at a near-constant angular speed. The response, f, is the RF fingerprint.

At 908, the RF fingerprint, f, is then concatenated with an arbitrary text, t, that defines the digital rights management information imposed by the disc publisher. At 908, the final string, m=f∥t, is formatted for storage on the optical disc, wherein formatting includes compressing, hashing, and/or signing with the private key of the issuer. At 912, the resulting signature as well as compressed m, are stored onto the disc. For instance, the data can be stored on the disc using a post-imprint technology. Additionally or alternatively, the data can be stored on a remote processor (discussed supra). It is to be appreciated that this is but one example, and a number of methodologies are possible within the scope and spirit of the subject innovation.

Figure 10:
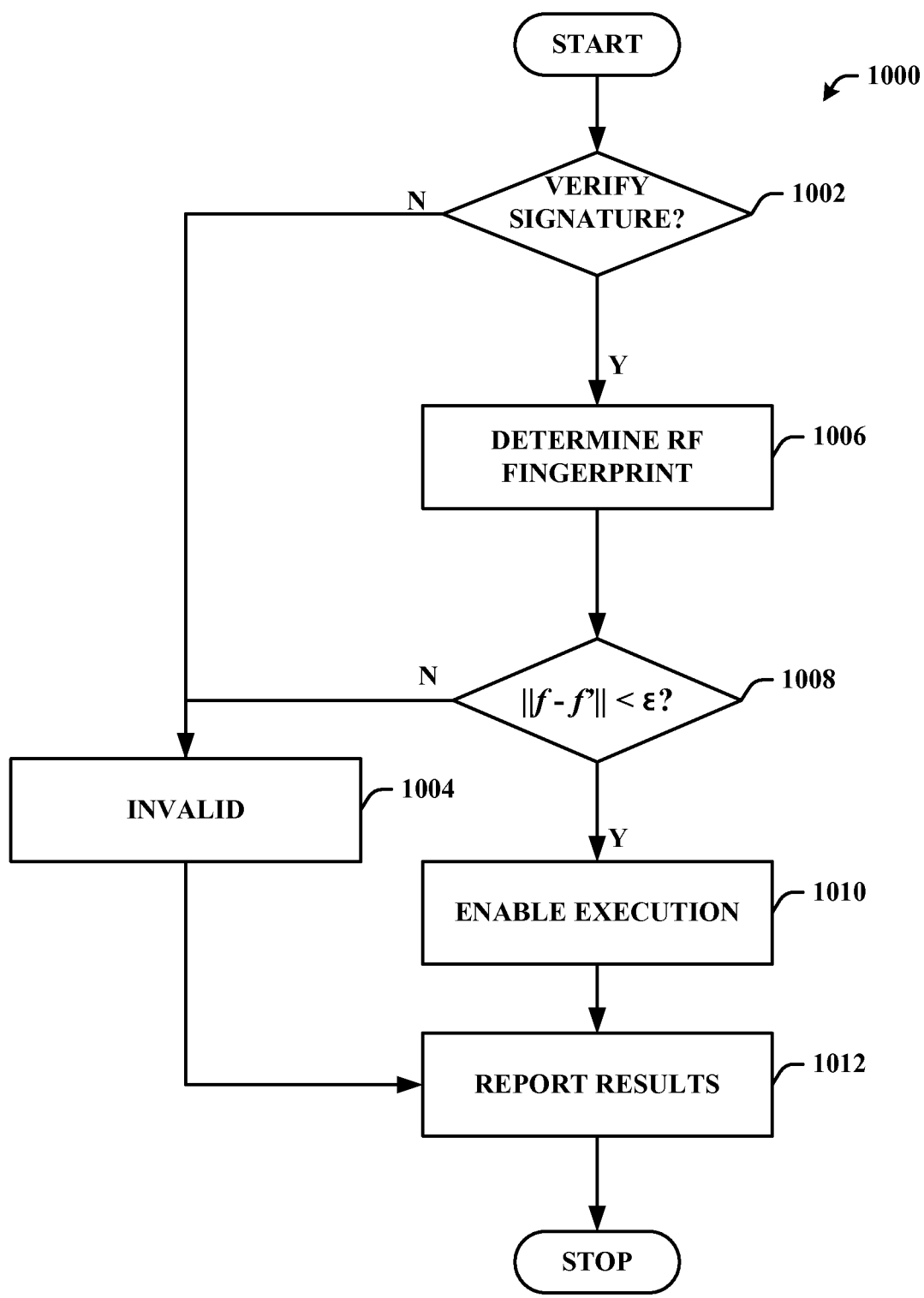
FIG. 10 illustrates an example methodology for verifying the authenticity of an optical media using electromagnetic scatterers in accordance with an aspect of the subject specification.

FIG. 10 illustrates an example methodology for verifying the authenticity of an optical media using radio frequency DNA in accordance with an aspect of the subject innovation. At 1002, a stored signature on the optical media can be verified based at least in part on an issuer's public key. Those skilled in the art will readily appreciate how to verify a signature using a public key. For instance the foregoing can be accomplished via a public key cryptosystem. If the stored signature cannot be verified then the optical media's certificate of authenticity (COA) is determined to be invalid (e.g., the optical media is not authentic) at 1004.

If the signature is verified, then at 1006, the radio frequency (RF) fingerprint embedded on the disc can be determined by measuring an electromagnetic response of the electromagnetic scatterers (e.g., RFDNA, RFDNA wires) embedded in the optical disc as it revolves at a near constant angular speed (discussed supra).

At 1008, the determined RF fingerprint can be compared to a stored RF fingerprint (e.g., control), and if the difference of the stored and determined RF fingerprints is within a predetermined threshold then the disc can be determined to be authentic. For example, this can be expressed using an equation the following equation:

$$\|f - f'\| < \epsilon$$

where f is the stored RF fingerprint (e.g., control), f' is the determined RF fingerprint, and ϵ is the predetermined threshold. If the determined RF fingerprint, f', and the control, f, are within the threshold ϵ, then at 1010 execution of the instructions contained on the optical media are enabled. For example, if the optical media contains a video, then the video can be executed, displayed, or otherwise played. If the determined RF fingerprint and the control are not within the predetermined threshold, then at 1004 the optical media's certificate of authenticity (COA) is determined to be invalid (e.g., the optical media is not authentic).

At 1012, the results can reported to a user and/or a main processing unit (e.g., remote processor). For instance, a message can be displayed to a user indicating the verification/authenticity status of the optical media. As an additional example, the authenticity of the optical media can be reported to the main processing unit using an encrypted channel over a public interconnect.

Figure 11:
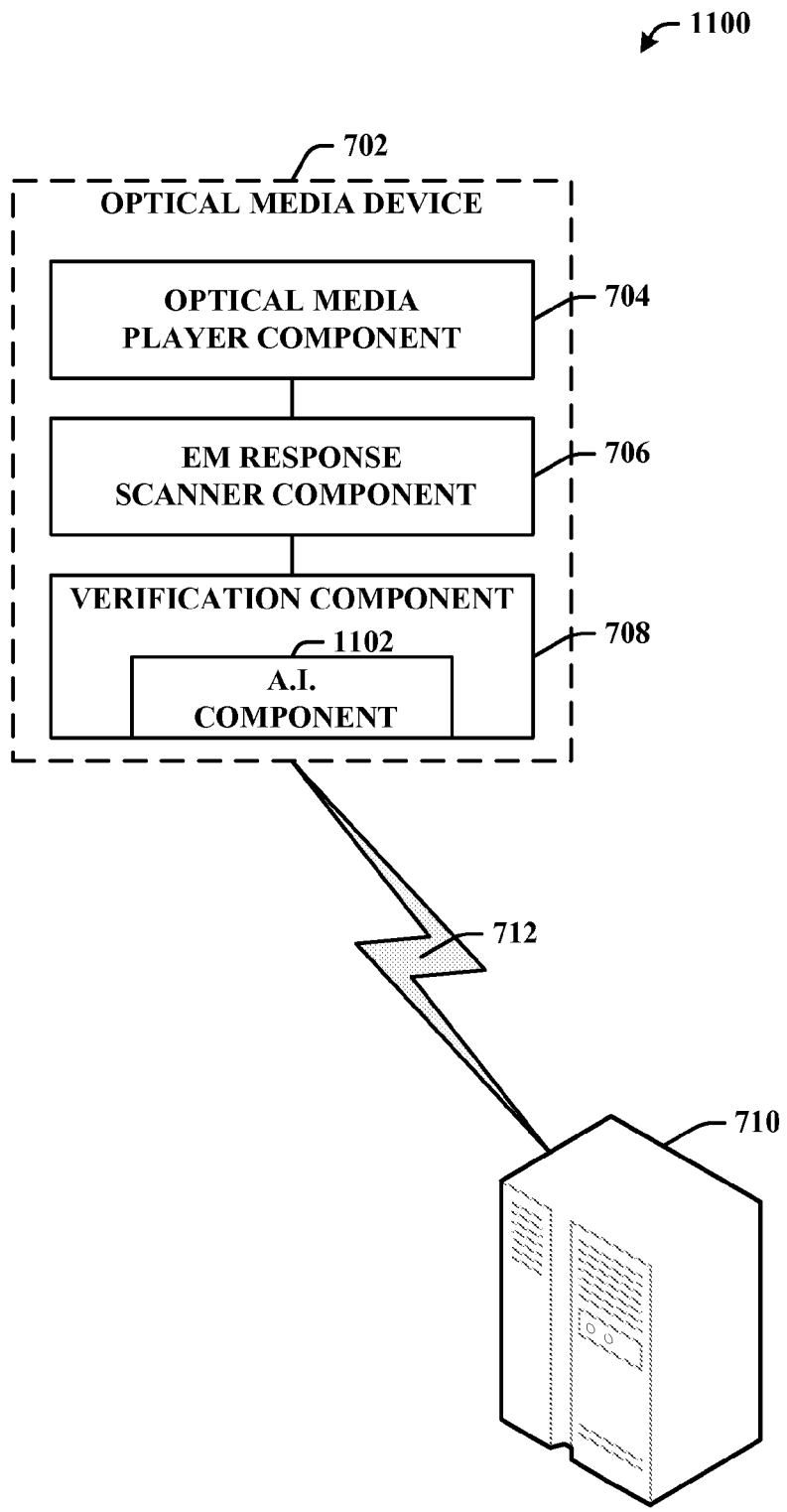
FIG. 11 illustrates a system that employs an artificial intelligence component which facilitates automating one or more features in accordance with the subject specification.

FIG. 11 illustrates a system 1100 that employs an artificial intelligence (AI) component 1102 which facilitates automating one or more features in accordance with the subject innovation. The subject innovation (e.g., in connection with inferring) can employ various AI-based schemes for carrying out various aspects thereof. For example, a process for verifying the authenticity of an optical medium can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 12:
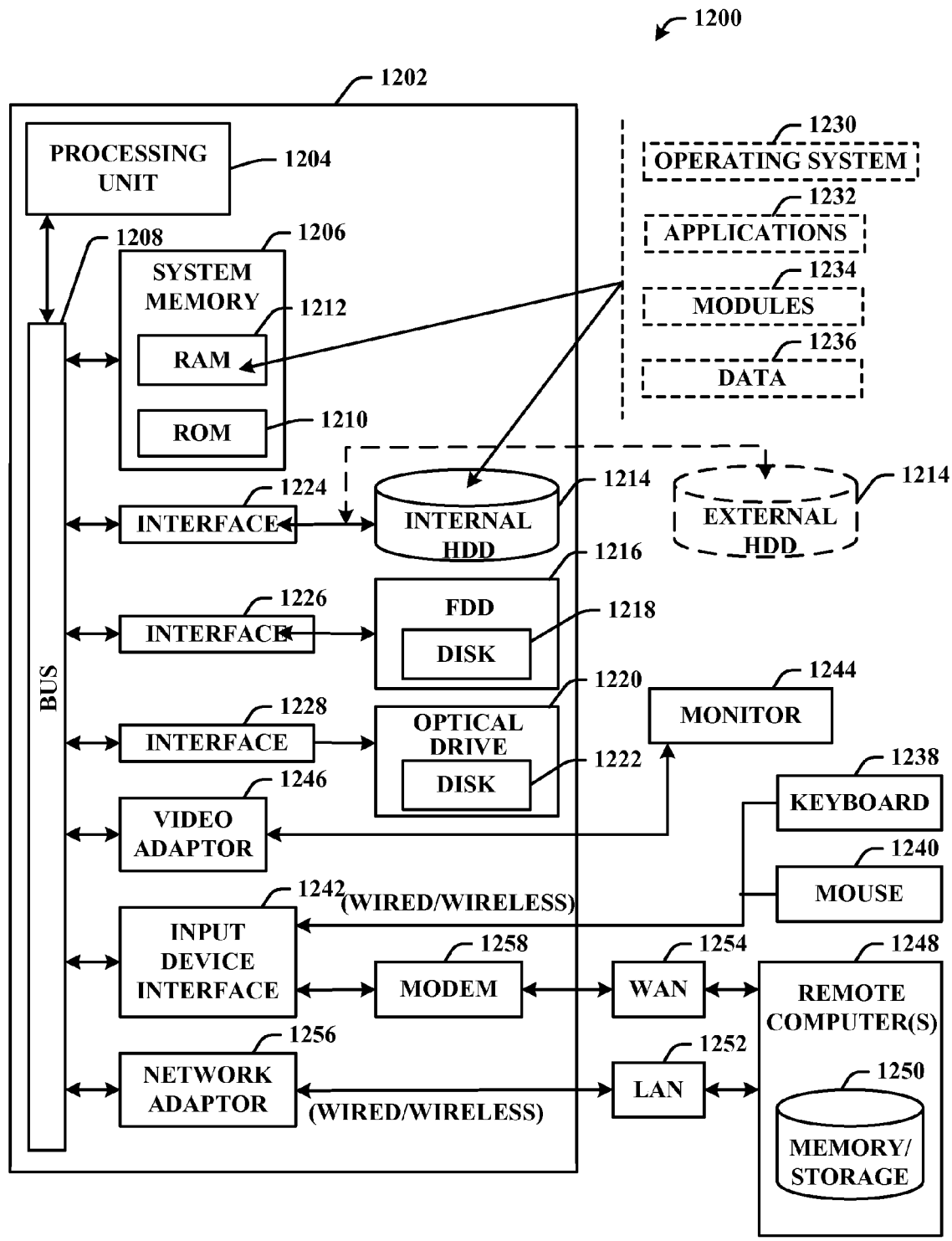
FIG. 12 illustrates an example computing environment that can be employed in connection with various aspects described herein.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1200 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the innovation that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable disc 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic disc, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
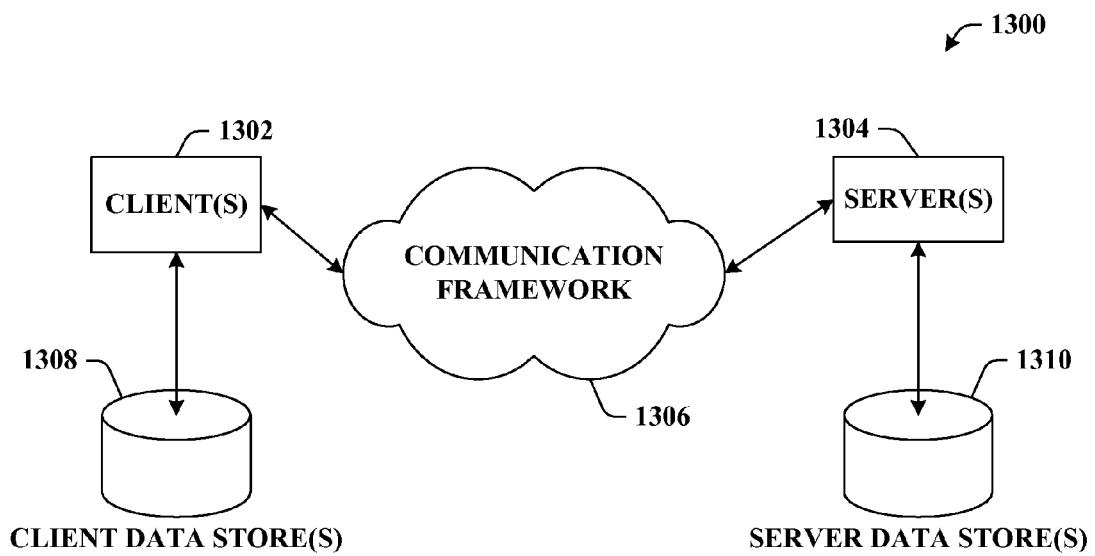
FIG. 13 is a schematic block diagram of a sample-computing environment with which the subject innovation can interact.

Referring now to FIG. 13, there is illustrated a schematic block diagram of an example computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

The system 1300 also includes one or more server(s) 1304. The server(s) 1304 can also be hardware and/or software (e.g., threads, processes, computing devices). The servers 1304 can house threads to perform transformations by employing the innovation, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system facilitating protection of optical media using random moving radio frequency scatterers, comprising:
 a media device that decodes optical media, the media device includes a processor coupled to at least one memory that retains instructions for:
 an optical media player component that analyzes data stored on at least one optical medium;
 an electromagnetic response scanner component that determines a radio frequency fingerprint of a constellation of scattering material embedded in an optical medium; and
 a verification component that authenticates digital rights of the optical medium based at least in part on the radio frequency fingerprint.

2. The system of claim 1, the electromagnetic response scanner component further includes an antenna matrix.

3. The system of claim 2, the antenna matrix facilitates determining the radio frequency fingerprint by determining an electromagnetic response of the scattering material embedded in the optical medium.

4. The system of claim 3, wherein the radio frequency fingerprint is based at least in part on a distinct radio frequency response resulting from the three dimensional positioning of the constellation of scattering material.

5. The system of claim 1, the verification component authenticates the digital rights of the optical media by at least one of: verifying the radio frequency fingerprint with a control fingerprint stored on the optical media, verifying the radio frequency fingerprint with a control fingerprint stored at a remote processing unit, wherein the verification component connects to the remote processing unit via a communication link, or using a public key cryptosystem.

6. The system of claim 1, the electromagnetic response scanner component is adapted to scan scattering material embedded on at least one of: an outer circumference of an optical media, or an inner circumference of an optical media.

7. The system of claim 1, the electromagnetic response scanner component is adapted to scan scattering material consisting mostly of a plurality of thin cut metallic wires.

8. The system of claim 1, the optical medium includes at least one of a compact disc (CD), a digital video disc (DVD), a high definition (HD) DVD, or a Blu-ray disc.

9. The system of claim 1, the verification component further includes an artificial intelligence component that facilitates automating one or more aspects of the system.

10. A method facilitating protection of optical media using random moving radio frequency scatterers, comprising:
analyzing an electromagnetic response of a constellation of scattering material embedded in an optical medium as the optical medium revolves at a substantially constant angular speed; and
authenticating a set of digital rights of the optical medium based at least in part on the electromagnetic response that is obtained by the analyzing as the optical medium revolves at the substantially constant angular speed.

11. The method of claim 10, further comprising initiating radio frequency waves via a set of antennas, and measuring the electromagnetic response of the scattering material embedded in an optical media.

12. The method of claim 10, further comprising authenticating the digital rights by authenticating the electromagnetic response of the constellation of scattering material against at least one control, wherein the control is stored on at least one of the optical medium, or in a remote data store.

13. The method of claim 10, further comprising authenticating the digital rights using a public key cryptosystem.

14. The method of claim 10, wherein the optical medium includes at least one of a compact disc (CD), a digital video disc (DVD), a high definition (HD) DVD, or a Blu-ray disc.

15. The method of claim 10, wherein the scattering material consist mostly of a plurality of thin cut metallic wires.

16. The method of claim 10, further comprising enabling optical data to be read from the optical medium if the digital rights are authenticated.

17. A method facilitating protection of optical media using random moving radio frequency scatterers, comprising:
randomly embedding a constellation of scattering material on an optical disc, positions of the randomly embedded scattering material on the optical disc creating a radio frequency fingerprint that uniquely identifies the optical disc;
determining the radio frequency fingerprint of the scattering material on the optical disc;
combining the radio frequency fingerprint with a set of digital rights policies in a data packet; and
storing the data packet on at least one of the optical disc, or a remote processor.

18. The method of claim 17, further comprising formatting the data packet, wherein formatting the data packet includes at least one of compressing the data packet, hashing the data packet, or signing the data packet a private key of an issuer.

19. The method of claim 18, further comprising embedding the constellation of scattering material on at least one of the outer-circumference of the optical disc, or the inner-circumference of the optical disc.

* * * * *